United States Patent [19]

Munoz et al.

[11] Patent Number: 4,893,753
[45] Date of Patent: Jan. 16, 1990

[54] PRESSURE SPIKE SUPPRESSING APPARATUS

[75] Inventors: Jose P. Munoz, Joplin, Mo.; Raymond M. Jordan, Wixom, Mich.

[73] Assignee: Ingersoll-Rand Company, Woodcliff Lake, N.J.

[21] Appl. No.: 315,082

[22] Filed: Feb. 24, 1989

Related U.S. Application Data

[63] Continuation-in-part of Ser. No. 69,914, Jul. 6, 1987, abandoned.

[51] Int. Cl.⁴ .............................................. A63H 3/18
[52] U.S. Cl. .................................... 239/578; 417/318
[58] Field of Search .................... 239/1, 101, 102, 93, 239/590, 569, 578; 60/433; 417/316, 318; 175/424

[56] References Cited

U.S. PATENT DOCUMENTS

| | | |
|---|---|---|
| 3,500,751 | 3/1970 | Robertson . |
| 4,029,440 | 6/1977 | Olsen .................................. 417/403 |
| 4,313,570 | 2/1982 | Olsen .................................. 239/583 |
| 4,335,999 | 6/1982 | Lamontagne et al. ................. 417/38 |

FOREIGN PATENT DOCUMENTS 48104  4/1977  Japan .

Primary Examiner—Andres Kashnikow
Assistant Examiner—Kevin P. Weldon
Attorney, Agent, or Firm—J. R. Bell; D. W. Tibbott; B. J. Murphy

[57] ABSTRACT

A waterjet cutting apparatus for limiting pressure spikes caused by hydraulic pressure surges. A hydraulic pump pressurizes hydraulic fluid used to operate the apparatus. An intensifier is driven by the pump. An on-off nozzle valve actuator is coupled to the pump and to the intensifier. First and second linkages are provided. The second linkage has a lost motion slot formed therein. An output control device is provided in the pump for controlling output from the pump and thus controlling the level of hydraulic fluid pressure admitted to the intensifier. A first control arm is coupled to the output control device and movable between a "MAX" and "MIN" position. An on-off nozzle actuator opens and closes the on-off nozzle valve remotely by way of the first linkage. A second control arm is coupled to the on-off nozzle valve actuator device and is movable between an "ON" and an "OFF" position. The first and second control arms are interconnected by the second linkage in such a way that the lost motion slot permits the first control arm to move from the "MAX" to the "MIN" position when the second control arm remains in the "ON" position thereby suppressing pressure spikes.

7 Claims, 1 Drawing Sheet

PRESSURE SPIKE SUPPRESSING APPARATUS

This is a continuation-in-part of copending U.S. patent application Ser. No. 069,914, filed on July 6, 1987, by Jose P. Munoz and Raymond M. Jordan and assigned to the assignee of the present invention, now abandoned.

BACKGROUND OF THE INVENTION

This invention pertains to pressured hydraulic fluid systems, and in particular to suppressing pressure spikes in a pressurized hydraulic fluid supply, especially in waterjet cutting apparatus.

Known waterjet cutting apparatus relies on fixed volume chambers, known in the industry as high pressure accumulators or high pressure attenuators, between the intensifier and the waterjet nozzle, to suppress the pressure spikes that occur during operational use of the apparatus. However, when the associated on-off valve for the waterjet nozzle is put in the "OFF" position, there occurs a pressure spike, also called "water hammer", which cannot be attenuated by the aforesaid fixed volume, or must be limitedly attenuated by an expensive relief valve. Obviously, such pressure spikes will be damaging to the apparatus involved.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing in a waterjet cutting apparatus having a hydraulic fluid supply and pump therefore, (a) an output control device for the hydraulic fluid pump and (b) an on-off nozzle valve, and remote actuator therefore, to control the pressurized water flow to the nozzle, causing such pressurized water to be expelled through a fine nozzle as a waterjet. This provides an apparatus for suppressing pressure spikes, which are susceptible of occurring when the nozzle valve is turned to an "OFF" or closed condition including the steps of setting the hydraulic pump output control device to a pressure level which is lower than a given operating pressure level at a time which is milliseconds before setting the on-off nozzle valve actuator in its "OFF" position, and then setting the on-off nozzle valve actuator in its "OFF" position.

The foregoing and other aspects will become apparent from the following detailed description of the invention when considered in conjunction with the accompanying drawing figures. It is to be expressly understood however, that the drawing figures are not intended as a definition of the invention but are for the purpose of illustration only.

DETAILED DESCRIPTION

Figure 1:
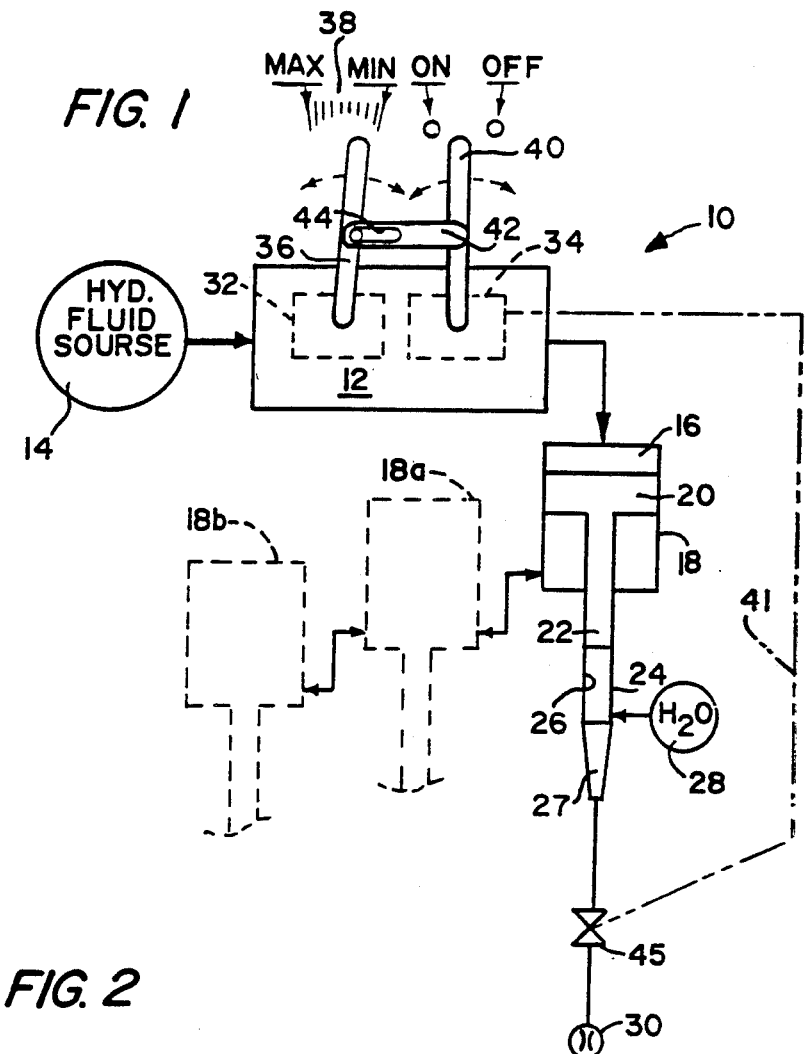
FIG. 1 is a schematic view illustrating a waterjet cutting apparatus incorporating an embodiment of the present invention.

As shown in the FIG. 1, a waterjet cutting apparatus 10 comprises an intensifier 18 which is driven by a hydraulic pump 12. Hydraulic fluid is supplied from a reservoir or tank 14, and the pump 12 pressures the supplied fluid and conducts the pressurized fluid to the hydraulic cylinder of the intensifier 18. Translatable within a low pressure side 16 of intensifier 18, is a piston 20 which is coupled to a plunger 22. Plunger 22 translates within a high-pressure side 24 of intensifier 18, and, specifically, within a narrow, cylindrical portion 26 of intensifier 18, to which water is admitted from a source 28 thereof. The outermost end 27 of portion 26 couples to an on-off nozzle valve 45, and then to a jet forming nozzle 30, through which a fine waterjet is expelled for cutting purposes. The aforesaid functioning of waterjet cutting apparatus is well known to those skilled in this art and, consequently, requires no further explanation herein.

As already noted, damaging pressure spikes occur when the nozzle valve 45 is turned to the "OFF" or closed position, then suddenly stopping the high pressure water flow coming from the intensifier 18. Even though the component 18 is manifolded with companion components 18a and 18b, as disclosed in U.S. Pat. No. 4,621,988, issued 11 Nov. 1986, to R. W. Decker, for a "Liquid Intensifier Unit" (the same being incorporated herein by reference), this is not sufficient to avoid pressure spikes.

The pump 12 has therein: (a) an output control device 32 which is operative to control the delivery, or pressure output of the pump 12, and hence, the level of hydraulic fluid pressure to be admitted to intensifier 18 from pump 12. The invention mechanically provides for the run-down of device 32 to a lower pressure setting milliseconds before the valve 45 is put in its "OFF" position.

For Example, device 32 has a control arm 36 which slues through a given, functional distance subtended by the scale 38 which bridges between the indicia "MAX" and "MIN". Too, on-off nozzle valve actuator 34 which opens or closes the nozzle valve 45 remotely via a first, valve operating linkage 41, has control arm 40 which slues through a same given functional distance lying between the indicia "ON" and "OFF" and which respectively correspond to an opening and closure of valve 45. A second linkage 42 couples the two arms 36 and 40 for joint movement. However, as can be seen in the drawing, the arms 36 and 40 are so linked that arm 36 necessarily reaches "MIN" on scale 38 before arm 40 reaches the "OFF" position due to the provision of a lost-motion slot 44 in the second linkage 42. However, arm 36 is free to sweep the full breadth of the scale 38 so long as arm 40 is in the "ON" position.

The same result can be achieved by electronically controlling the reduction of the hydraulic pump pressure before opening valve 45. For example, by using a delay timing device instead of the mechanical linkage described above.

Figure 2:
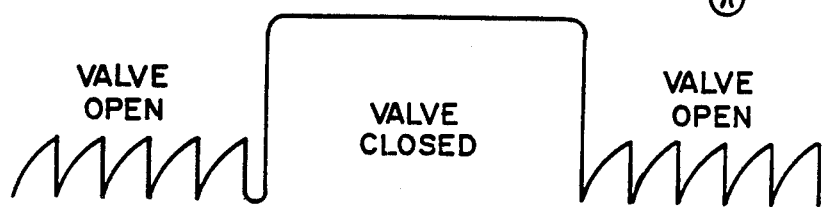
FIG. 2 is a graphic view illustrating a pressure spike occurring in a system operating without the benefit of the present invention.

FIG. 2 graphically illustrates a pressure spike which occurs in a standard unit when the on-off valve actuator 34 is closed, or moved to the "OFF" position without the benefit of the present invention. Such a pressure spike has been found to occur when using an orifice size of 0.018 in. at an accumulator volume of 27 cu. in. and a system pressure of 27 Kpsig.

Figure 3:
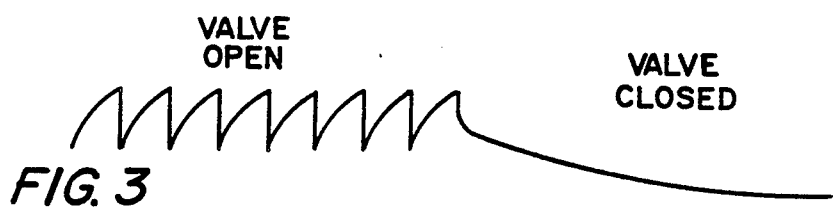
FIG. 3 is a graphic view illustrating that no pressure spike occurs in a system operating with the benefit of the present invention.

FIG. 3 graphically illustrates that no pressure spike occurs where the on-off valve actuator 34 is timed to close after the output control device 32 is set to the "MIN" setting in accordance with the present invention. Such an illustration has been found to occur under the conditions expressed above except that the system pressure in FIG. 3 is at 46 Kpsig.

While this invention has been illustrated and described in accordance with a preferred embodiment, it is recognized that variations and changes may be made therein without departing from the invention as set forth in the claims.

What is claimed is:

1. A waterjet cutting apparatus for limiting pressure spikes caused by hydraulic pressure surges, comprising:
   hydraulic pump means for pressurizing hydraulic fluid used to operate the apparatus;
   an intensifier driven by the hydraulic pump means;
   an on-off nozzle valve coupled to the pump means and to the intensifier;
   a first linkage;
   a second linkage having a lost motion slot formed therein;
   an output control means in the pump for controlling output from the pump and controlling the level of hydraulic fluid pressure admitted to the intensifier;
   a first control arm coupled to the output control means and movable between a "MAX" and a "MIN" position;
   an on-off nozzle valve actuator means for opening and closing the on-off nozzle valve remotely with the first linkage;
   a second control arm coupled to the on-off nozzle valve actuator means and movable between an "ON" and an "OFF" position, the first and second control arms being interconnected by the second linkage, whereby the lost motion slot permits the first control arm to move from the "MAX" to the "MIN" position before the nozzle valve is closed by movement of the second control arm to the "OFF" position, thereby suppressing pressure spikes.

2. The apparatus as defined in claim 1, wherein the pump means is connected to receive hydraulic fluid from a reservoir.

3. The apparatus as defined in claim 1, wherein the intensifier has a high pressure side and includes a piston coupled to a plunger for translating within the high pressure side.

4. The apparatus as defined in claim 3, wherein the high pressure side includes a narrow cylindrical portion.

5. The apparatus as defined in claim 3, including:
   means for supplying water to the high pressure side.

6. The apparatus as defined in claim 3, including:
   a jet forming nozzle connected to the high pressure side.

7. The apparatus as defined in claim 1, wherein the hydraulic pump means drives a second and third intensifier.

* * * * *